(12) United States Patent
Grichener et al.

(10) Patent No.: US 7,994,940 B2
(45) Date of Patent: *Aug. 9, 2011

(54) MECHANICAL LATCH LOCKING DETECTION SENSORS

(75) Inventors: Alexander Grichener, Plymouth, MN (US); Chuang-Chia Lin, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/807,351

(22) Filed: Sep. 2, 2010

(65) Prior Publication Data

US 2011/0018741 A1    Jan. 27, 2011

Related U.S. Application Data

(63) Continuation of application No. 11/827,591, filed on Jul. 12, 2007, now Pat. No. 7,843,363.

(51) Int. Cl.
*G08B 21/00* (2006.01)
(52) U.S. Cl. .................. 340/945; 340/5.64; 340/982
(58) Field of Classification Search .............. 340/945, 340/5.64, 948, 950, 951, 954–956, 959–961, 340/963–964, 973, 982
See application file for complete search history.

(56) References Cited

U.S. PATENT DOCUMENTS

| 3,600,023 A | 8/1971 | Gudde |
| 3,695,096 A | 10/1972 | Kutsay |
| 4,078,186 A | 3/1978 | Folen et al. |
| 4,094,003 A | 6/1978 | Kinsner et al. |
| 4,259,548 A | 3/1981 | Fahey et al. |
| 4,265,124 A | 5/1981 | Lim et al. |
| 4,318,557 A | 3/1982 | Bourne et al. |
| 4,365,775 A | 12/1982 | Glancy |
| 4,421,349 A | 12/1983 | Greiert, Jr. |
| 4,613,099 A | 9/1986 | Smith et al. |
| 4,623,813 A | 11/1986 | Naito et al. |
| 4,679,750 A | 7/1987 | Burhans |
| 4,709,210 A | 11/1987 | Pond |
| 4,828,299 A | 5/1989 | Poe |

(Continued)

FOREIGN PATENT DOCUMENTS

GB    2 267 122 A    11/1993

(Continued)

OTHER PUBLICATIONS

International Search Report and Written Opinion for PCT/US2008/069787 dated Oct. 29, 2008.

*Primary Examiner* — Daniel Previl
(74) *Attorney, Agent, or Firm* — Scott D. Wofsy; Edwards Angell Palmer & Dodge LLP

(57) ABSTRACT

The invention provides a sensor for determining when a latch for securing an engine cowl on an aircraft is secured by detecting the proximity of a latch hook and a latch pin. The sensor includes a resonant circuit configured and adapted to transmit a status signal when the latch is in a secured state. The sensor also includes a means for conveying status information of the latch to a location remote from the latch based on the status signal, the conveying means being operably connected to the resonant circuit. The invention also provides a method of determining when a latch is open or secured by detecting the proximity of a latch hook and a latch pin.

9 Claims, 10 Drawing Sheets

U.S. PATENT DOCUMENTS

| | | |
|---|---|---|
| 5,008,647 A | 4/1991 | Brunt et al. |
| 5,152,559 A | 10/1992 | Henrichs |
| 5,213,286 A | 5/1993 | Elliott et al. |
| 5,350,136 A | 9/1994 | Prosser et al. |
| 5,518,206 A | 5/1996 | Arnold et al. |
| 5,620,212 A | 4/1997 | Bourne et al. |
| 5,813,218 A | 9/1998 | Kohlbacher |
| 5,959,388 A | 9/1999 | Graebner et al. |
| 5,984,241 A | 11/1999 | Sparks |
| 5,984,382 A * | 11/1999 | Bourne et al. ................. 292/113 |
| 6,032,901 A | 3/2000 | Carimali et al. |
| 6,042,156 A | 3/2000 | Jackson |
| 6,046,657 A | 4/2000 | Alers et al. |
| 6,144,288 A | 11/2000 | Jahn et al. |
| 6,144,332 A | 11/2000 | Reindl et al. |
| 6,272,916 B1 | 8/2001 | Taniguchi et al. |
| 6,279,971 B1 * | 8/2001 | Dessenberger, Jr. .......... 292/113 |
| 6,325,428 B1 | 12/2001 | Do |
| 6,334,588 B1 | 1/2002 | Porte et al. |
| 6,362,543 B1 | 3/2002 | Ellis |
| 6,382,690 B1 | 5/2002 | Dessenberger, Jr. |
| 6,571,638 B2 | 6/2003 | Hines et al. |
| 6,891,286 B2 | 5/2005 | Flanagan et al. |
| 6,933,932 B2 | 8/2005 | Knowles |
| 7,065,459 B2 | 6/2006 | Kalinin et al. |
| 7,066,501 B2 | 6/2006 | Meineke et al. |
| 7,100,452 B2 | 9/2006 | Marsh |
| 7,131,672 B2 | 11/2006 | Pratt et al. |
| 7,165,455 B2 | 1/2007 | Magee et al. |
| 7,461,871 B2 | 12/2008 | Vauchel |
| 7,843,363 B2 | 11/2010 | Grichener et al. |
| 2003/0160681 A1* | 8/2003 | Menard et al. ............... 340/5.64 |
| 2004/0012212 A1* | 1/2004 | Pratt et al. ................ 292/341.16 |
| 2006/0038410 A1 | 2/2006 | Pratt et al. |
| 2006/0123913 A1 | 6/2006 | Marsh |
| 2007/0054644 A1 | 3/2007 | Fitzgibbon et al. |

FOREIGN PATENT DOCUMENTS

| | | |
|---|---|---|
| WO | WO-00/75900 | 12/2000 |

* cited by examiner

MECHANICAL LATCH LOCKING DETECTION SENSORS

CROSS-REFERENCE TO RELATED APPLICATION

The subject application in a continuation of U.S. patent application Ser. No. 11/827,591, filed Jul. 12, 2007 now U.S. Pat. No. 7,843,363, the disclosure of which is herein incorporated by reference in its entirety.

BACKGROUND OF THE INVENTION

1. Field of the Invention

The present invention relates to a sensor for detecting when a latch is secured. Particularly, the present invention is directed to a sensor for detecting when a latch for securing an aircraft engine cowl is secured.

2. Description of Related Art

A variety of devices and methods are known in the art for detecting whether an aircraft latch is in a secured state. Of such devices, many are directed to determining whether an aircraft latch for securing an engine cowl is in a secured state. FIGS. 1a-1b show an aircraft engine 1 attached to a strut 7 under an aircraft wing (not shown). Engine 1 includes two cowls 2 and 3 that can both be opened to allow access to components inside engine 1, as shown in FIG. 1a. FIG. 1b shows an aircraft engine 1 (inlet 6 has been removed for clarity) with an engine cowl 2 open and another engine cowl 3 closed. Cowls 2 and 3 can be hinged open by releasing a latch 4 from a stationary pin/keeper component 5. It is also common for pin component 5 to be attached to one cowl door (e.g. 2) with a corresponding latch 4 attached to the opposite cowl door (e.g. 3).

Opening the cowls allows the engines to be serviced and maintained. However, failure to re-secure the cowls after opening them can lead to malfunction of the cowls during take-off or flight. In some circumstances, the cowls can be blown off from the aircraft completely. Fortunately, the loss of an engine cowl is not generally a serious threat to an aircraft. However, it is nonetheless advantageous to reduce the number of cowl incidents. Typically, the onus is on ground personnel to verify that all engine cowls are secured before an aircraft pulls away from its gate. It is believed that the prevailing cause of engine cowl incidents is failure of ground crew to securely latch engine cowls prior to departure.

Efforts have been made to assist ground crews in verifying engine cowls are secured. U.S. Pat. No. 6,334,588 to Porte describes a system for securing fan cowls in which a maintenance crew can visually detect an unsecured fan cowl because edges of unsecured fan cowls protrude enough to allow for visual detection. Another visual technique for detecting unsecured cowls is described in U.S. Pat. No. 5,518,206 to Arnold et al., which describes an apparatus that extends a flag visible to ground crew when an engine cowl is unsecured.

Other efforts have been made in creating systems to inform operators whether an engine cowl is secured or not by means of sensors. U.S. Patent Application No. 2006/0038410 to Pratt et al., describes a latch having sensors to assist controlling an electrical motor, which operates to open and close a latch for a fan cowl. The sensors can also inform a controller as to the status of the latch.

Such conventional methods and systems generally have been considered satisfactory for their intended purpose. However, while visual cues make it easier to verify that an engine cowl is securely latched, these techniques still rely on the ground crew to remember to check the latches. Although solutions to this problem have been developed, such as by using sensors to detect the state of a cowl latch, as in U.S. Patent Application No. 2004/0012212 to Pratt et al., there still remains a continued need in the art for a latch sensor that is more sensitive, reliable, and easier to change out for replacement. There also remains a need in the art for a system of latch detection that is inexpensive and easy to make, including retrofitting existing latches without substantially altering the latch itself. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a sensor for determining when a latch for securing an engine cowl of an aircraft is secured by detecting the proximity of a latch hook and latch pin. The sensor includes a resonant circuit configured and adapted to transmit a status signal when the latch is in a secured state. Conveying means are operably connected to the resonant circuit for conveying information on the status of the latch to a location remote from the latch based on the status signal.

In accordance with a further aspect of the invention, the resonant circuit can be formed by securing the latch. The sensor can further include a power source operably connected to the resonant circuit.

In accordance with another aspect of the invention, the resonant circuit includes an antenna coupled to a capacitor and/or inductor. The capacitor has a first plate configured to be connected to the hook of the latch and a second plate configured to be connected to the pin of the latch. The first and second plates are configured to be in closely aligned proximity when the latch is secured, and to be out of closely aligned proximity when the latch is open, causing the status signal to be transmitted through the antenna when the latch is secured. The resonant circuit can be an RF resonator circuit configured and adapted to transmit the status signal wirelessly in RF bandwidths by way of the antenna. The power source can include an RF source configured to transmit RF energy to power the RF resonator, wherein the RF resonator circuit is configured to emit the status signal when the latch is in the secured state.

In accordance with still another aspect of the invention, the power source and the conveying means may be combined in an RF transceiver. The transceiver is configured and adapted to wirelessly transmit RF energy to the RF resonator, wirelessly receive the signal from the antenna when the latch is in the secured state, and convey the status information on the secured state of the latch to the remote location. The RF transceiver can include an onboard power source configured to power the RF transceiver, wherein the RF transceiver is configured to convey the status information wirelessly to the remote location. The RF transceiver can be configured to receive power from an external source through an electrical conductor. The RF transceiver can also be configured to convey the status information to the remote location by way of an electrical conductor, optic fiber, or other suitable means of transmission.

The invention also includes a sensor for determining when a latch for securing an engine cowl of an aircraft is secured by detecting proximity of a latch hook and a latch pin. The sensor includes a resonant circuit configured and adapted to transmit a first signal when the latch is in an opened state, and to transmit a second signal when the latch is in a secured state. Conveying means are operably connected to the resonant circuit for conveying status information of the latch to a location remote from the latch based on one of the first and second signals.

In accordance with another aspect of the invention, the resonant circuit includes an electromechanical switch having a switch body configured and adapted to be connected to one of the hook and pin of the latch, as well as a moveable actuator moveable to a plurality of positions. The actuator can be moved to a first position when the latch is in the opened state to cause the circuit to transmit the first signal indicative of the latch being open. The actuator can be moved to a second position when the latch is in the secured state to cause the circuit to transmit the second signal indicative of the latch being secured.

In accordance with a further aspect of the invention, the sensor further may include a resilient member configured to urge the actuator to the first position when the latch is in the opened state. The switch body can be configured to be connected to the hook so that the actuator is moved to the second position when the latch is moved to the secured state. The switch body can be configured to be connected to the pin so that the actuator is moved to the second position when the latch is moved to the secured state.

In accordance with still another aspect of the invention, the resonant circuit can include a first RF emitter configured to transmit the first signal at a first frequency and a second RF emitter configured to transmit the second signal at a second frequency. The actuator may be configured to electrically connect an antenna to one of the first and second RF emitters at a time. For example, the actuator may (i) connect the first emitter to the antenna to transmit the first frequency in the first position and (ii) connect the second emitter to the antenna to transmit the second frequency in the second position. The first and second RF emitters can be electrical or electro-mechanical resonators, and the power source can include an RF source configured to transmit RF energy to power the RF resonators.

In further accordance with the invention, the power source and conveying means may be combined in an RF transceiver configured and adapted to: wirelessly transmit RF energy to the RF resonators, wirelessly receive the first and second signals from the antenna when the latch is in the opened and secured state, respectively, and convey the status information on the opened and secured states of the latch to the remote location. The RF transceiver can include an onboard power source configured to power the RF transceiver, and the RF transceiver can be configured to convey the status information wirelessly to the remote location. The RF transceiver can also be configured to receive power from an external source through an electrical conductor, and the RF transceiver can be configured to convey the status information to the remote location by way of an electrical conductor, optic fiber, or other suitable means.

The invention includes a system for detecting when a latch of an engine cowl on an aircraft is securely latched. The system includes an RF resonator circuit operably connected to the latch. The RF resonator circuit has at least one RF resonator operably connected to an antenna. The RF resonator circuit is configured and adapted to transmit by way of the antenna a first signal generated by the at least one RF resonator when the cowl is unlatched, and to transmit by way of the antenna a second signal generated by the at least one RF resonator when the cowl is securely latched. The system further includes an RF transceiver configured and adapted to power the at least one RF resonator with RF energy at a first wavelength, receive the first and second signals, and send a status signal of the latch, based on the first and second signals.

The invention further includes a latch for securing the engine cowl of an aircraft including a first latch body attached to a first engine cowl. The first latch body includes a latch pin. A second latch body is attached to a second engine cowl. The second latch body includes a latch hook configured and adapted to engage the latch pin when the latch is in a secured state and to disengage the latch pin when the latch is in an opened state. An RF resonator circuit is connected to at least one of the first and second latch bodies. The RF resonator circuit is configured and adapted to transmit a first signal when the latch is in the opened state. The system also includes means for conveying status information regarding the state of the latch to a location remote from the latch based on the first signal. The conveying means are operably connected to the RF resonator circuit.

In accordance with a further aspect of the invention, the RF resonator circuit may be further configured and adapted to transmit a second signal when the latch is in the secured state. The conveying means are preferably configured and adapted to convey status information based on the first and second signals.

The invention also includes a method for determining when a latch is opened or secured by detecting the proximity of a latch hook and pin. The latch hook and pin are engaged together when the latch is in a secured state and are disengaged from each other when the latch is in an opened state. The method includes transmitting a first RF signal from an RF resonator circuit when the latch is in the secured state, transmitting a second RF signal when the latch is in the opened state, and conveying status information regarding the opened or secured state to a location remote from the latch based on at least one of the signals.

In accordance with another aspect of the invention, the method further includes transmitting RF energy from an RF transceiver and receiving the RF energy in the RF resonator circuit to power the RF resonator circuit. The method can also include the step of detecting the first signal with the RF transceiver.

The invention also includes a kit for retrofitting a latch for securing an engine cowl of an aircraft, wherein the latch includes a hook and pin that engage each other when the latch is in a secured state and disengage each other when the latch is in an opened state. The kit includes an RF resonator circuit configured and adapted to transmit a first signal when the latch of the engine cowl is in the opened state, and to transmit a second signal when the latch of the engine cowl is in the secured state. The kit also includes means for conveying status information regarding the status of a latch based on the first and second signal to a second location. The means for conveying are configured and adapted to be operably connected to the RF resonator circuit.

In accordance with another aspect of the invention, the RF resonator circuit may include an electromechanical switch with a switch body configured and adapted to be attached to one of the hook and pin of the latch so that the actuator of the switch can be moved to a first position when the latch is in the opened state causing the circuit to transmit the first signal indicative of the latch being in the opened state. The switch body is also preferably configured and adapted so that the actuator can be moved to a second position when the latch is in the secured state causing the RF resonator circuit to transmit the second signal indicative of the latch being in the secured state. The switch body can further include a resilient member configured and adapted to urge the actuator to the first position when the latch is in the opened state. The switch body can be configured and adapted to be attached to the hook of the latch so that the actuator can be moved to the second position when the latch is moved to the secured state. It is also possible that the switch body can be configured and adapted to be attached to the pin of the latch so that the actuator can be moved to the second position when the latch is moved to the secured state.

The invention also includes another embodiment of a kit for retrofitting a latch for securing an engine cowl of an aircraft, wherein the latch includes a hook and a pin which engage each other when the latch is in a secured state and disengage each other when the latch is in an opened state. The kit includes an RF resonator circuit configured and adapted to transmit a signal when the latch of the engine cowl is in the secured state. The kit also includes a means for conveying status information regarding the state of the latch based on the signal to a second location. The means for conveying are configured and adapted to be operably connected to the RF resonator circuit. The RF resonator circuit includes an antenna coupled to a capacitor having a first plate configured and adapted to be connected to the hook of the latch and a second plate configured and adapted to be connected to the pin of the latch. The first and second plates are configured and adapted to be in closely aligned proximity when the latch is secured. The first and second plates are also configured and adapted to be out of closely aligned proximity when the latch is open, causing the signal to be transmitted through the antenna.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Figure 1A:
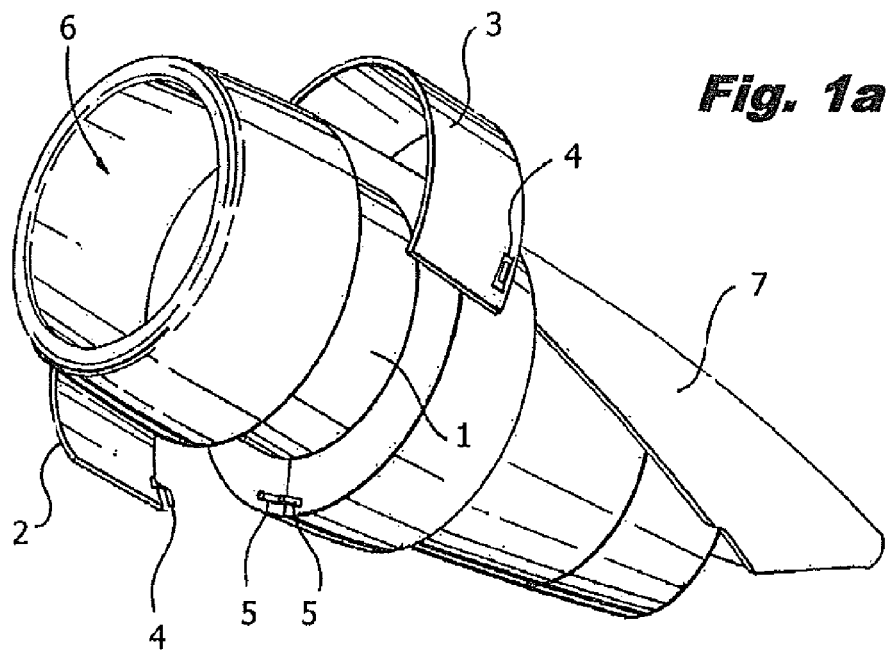
FIG. 1a is a perspective view of a typical aircraft engine, showing both cowl doors in an opened position.
Figure 1B:
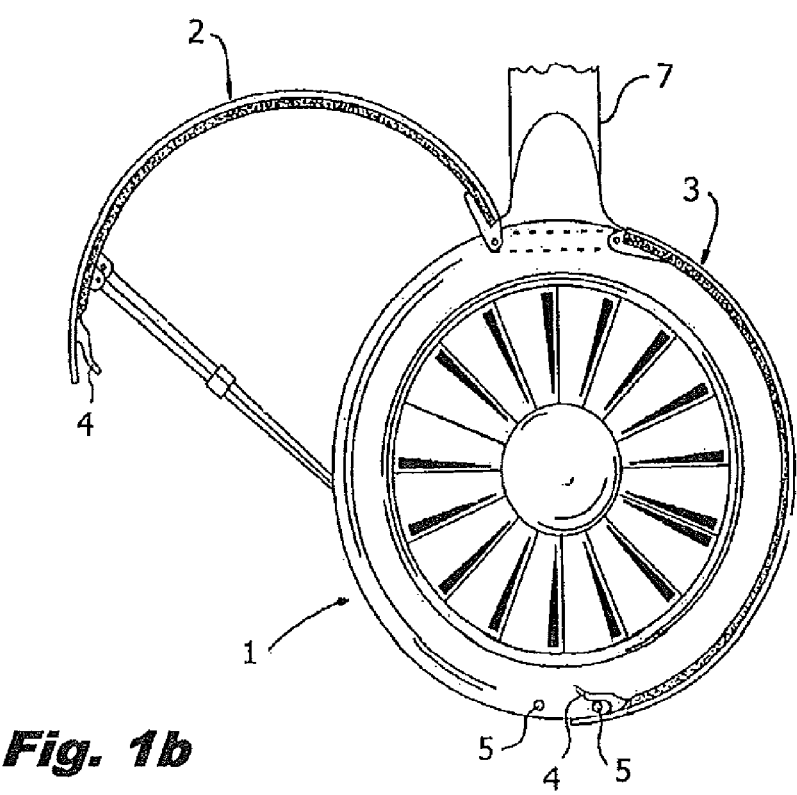
FIG. 1b is a front view of a typical aircraft engine, showing one cowl open and one cowl closed.

Reference will now be made in detail to the present preferred embodiments of the invention, examples of which are illustrated in the accompanying drawings. The method and corresponding steps of the invention will be described in conjunction with the detailed description of the system.

The devices and methods presented herein may be used for detecting when a latch is secured. The present invention is particularly suited for detecting when an aircraft engine cowl is securely latched.

In accordance with the invention, a sensor is provided for determining when a latch for securing an engine cowl of an aircraft is secured by detecting the proximity of a latch hook and a latch pin. The sensor includes a resonant circuit configured and adapted to transmit a status signal when the latch is in a secured state. The sensor also includes means for conveying status information of the latch to a location remote from the latch based on the status signal. The conveying means are operably connected to the resonant circuit.

For purpose of explanation and illustration, and not limitation, a partial view of an exemplary embodiment of the sensor in accordance with the invention is shown in FIGS. 2-5 and is designated generally by reference character 100. Other embodiments of a sensor in accordance with the invention, or aspects thereof, are provided in FIGS. 6-11, as will be described.

Figure 2:
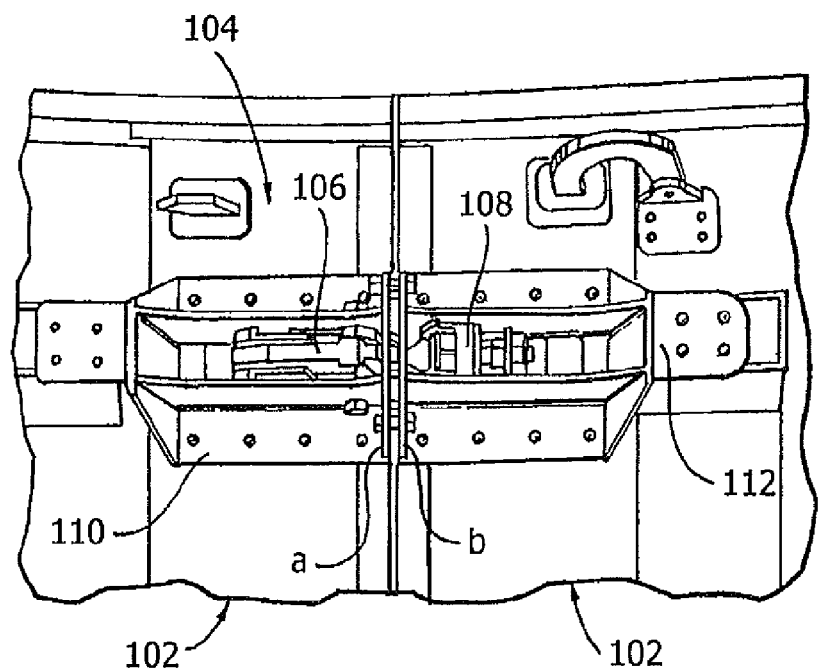
FIG. 2 is a perspective view of a typical engine cowl latch, showing the latch in a secured position with the hook of the latch locked to the pin/keeper of the latch.
Figure 3:
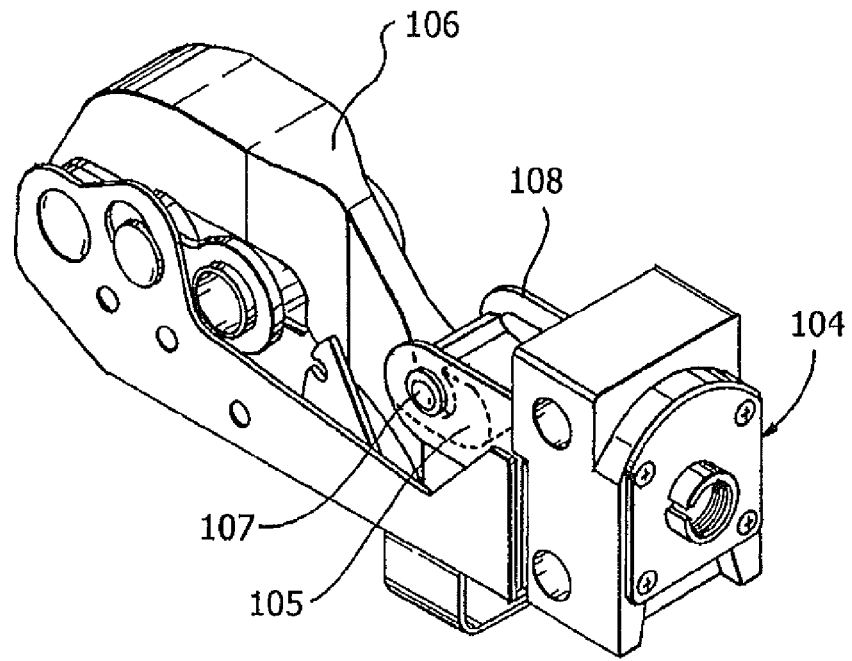
FIG. 3 is a perspective view of a portion of the latch of FIG. 2, showing the hook and latch in greater detail.

In accordance with the invention, a sensor including a resonant circuit is provided, the resonant circuit being configured and adapted to transmit a status signal when the latch is in a secured state. For purposes of illustration and not limitation, as embodied herein and as depicted in FIGS. 2-3, cowl doors 102 are provided with latch 104 for locking cowl doors 102 in a secure position, and for unlocking cowl doors 102 when necessary to access the aircraft engine. Latch 104 has two main bodies. Hook body 106 has a hook 105 that can be secured to pin 107 of pin body 108 to lock the latch (hook 105 is visible through pin body 108 in FIG. 3, as well as in FIGS. 7-8). Hook body 106 and pin body 108 are each connected to a respective bracket (110 and 112, respectively) and each bracket 110, 112 is secured to a cowl door 102. Latch 104 is a typical over-center latch that can be actuated by movement of a handle 130 (not shown in FIGS. 2-3, but see FIGS. 7-8) to release hook 105 from pin 107 in order to open cowl doors 102. There are a few basic latch designs that are well accepted and are approved by government regulatory bodies for use in aircraft, for example. Therefore it is desirable to provide a system that can sense the state of a latch without requiring significant modification of the latch itself.

Figure 4:
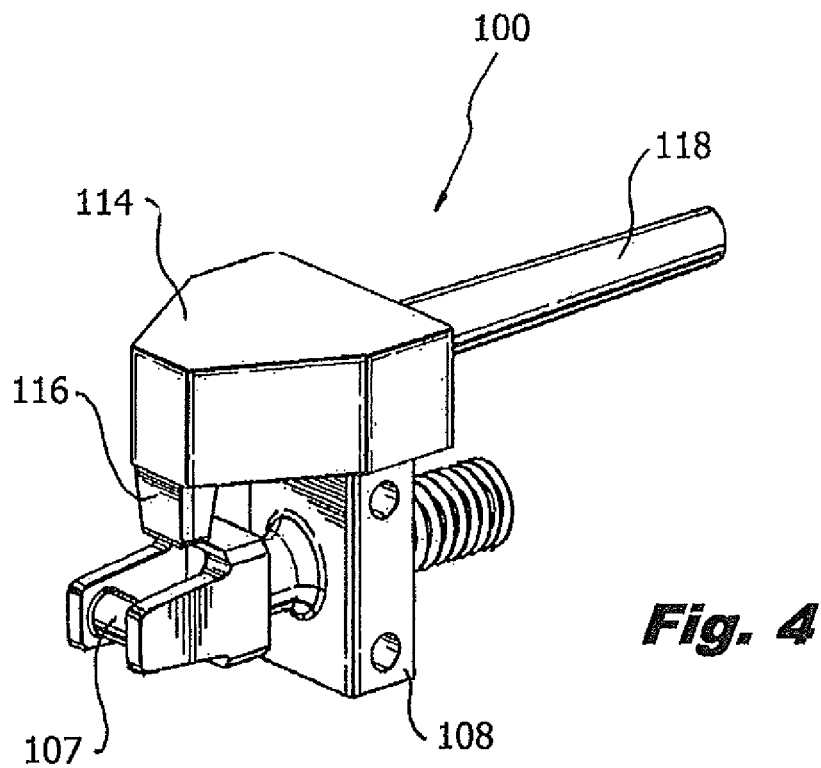
FIG. 4 is a perspective view of a first representative embodiment of a mechanical latch locking detection sensor in accordance with the present invention, showing a limit switch type sensor attached to a pin body of the latch of FIG. 2.
Figure 5:
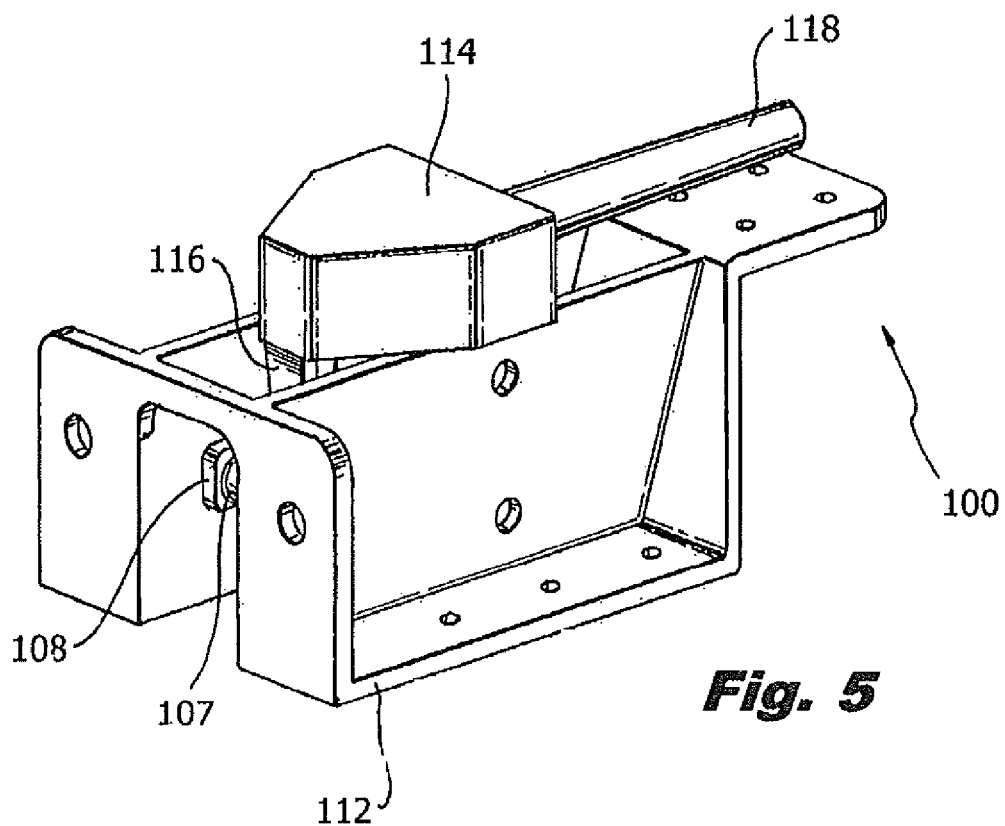
FIG. 5 is a perspective view of the sensor of FIG. 4 in accordance with the present invention, showing part of the latch bracket in place over the pin body of the latch.

With reference now to FIG. 4, sensor 100 is depicted attached to pin body 108. Sensor 100 includes sensor body 114, which houses a mechanical limit switch 116 and a resonant circuit 120 (see FIG. 6). An antenna 118 extends from sensor body 114, which allows circuit 120 to send and receive signals. FIG. 5 shows sensor 100 mounted to pin body 108 within pin body bracket 112. Switch 116 is positioned near pin 107 in a location that interferes with the path of hook 105 as hook 105 moves into position to secure latch 104 in a locked position. Hook 105 actuates switch 116 in order to reach the secured position in which hook 105 is secured to pin 107. Depending on the configuration of the particular latch 104, switch 116 can be actuated by sliding back and forth on switch body 114, by being depressed and released within switch body 114, rotated with respect to switch body 114, or any combination of these movements.

As long as hook 105 is secured to pin 107, switch 116 will be held in a first position. However, when hook 105 is released and retracted from pin 107, a resilient member in switch 116 causes the switch to move to a second position. Thus each time latch 104 is opened or closed, switch 116 is actuated. Sensor 100 exploits this switching to send a signal based on the position of switch 116 indicative of whether latch 104 is secured or opened.

Figure 6:
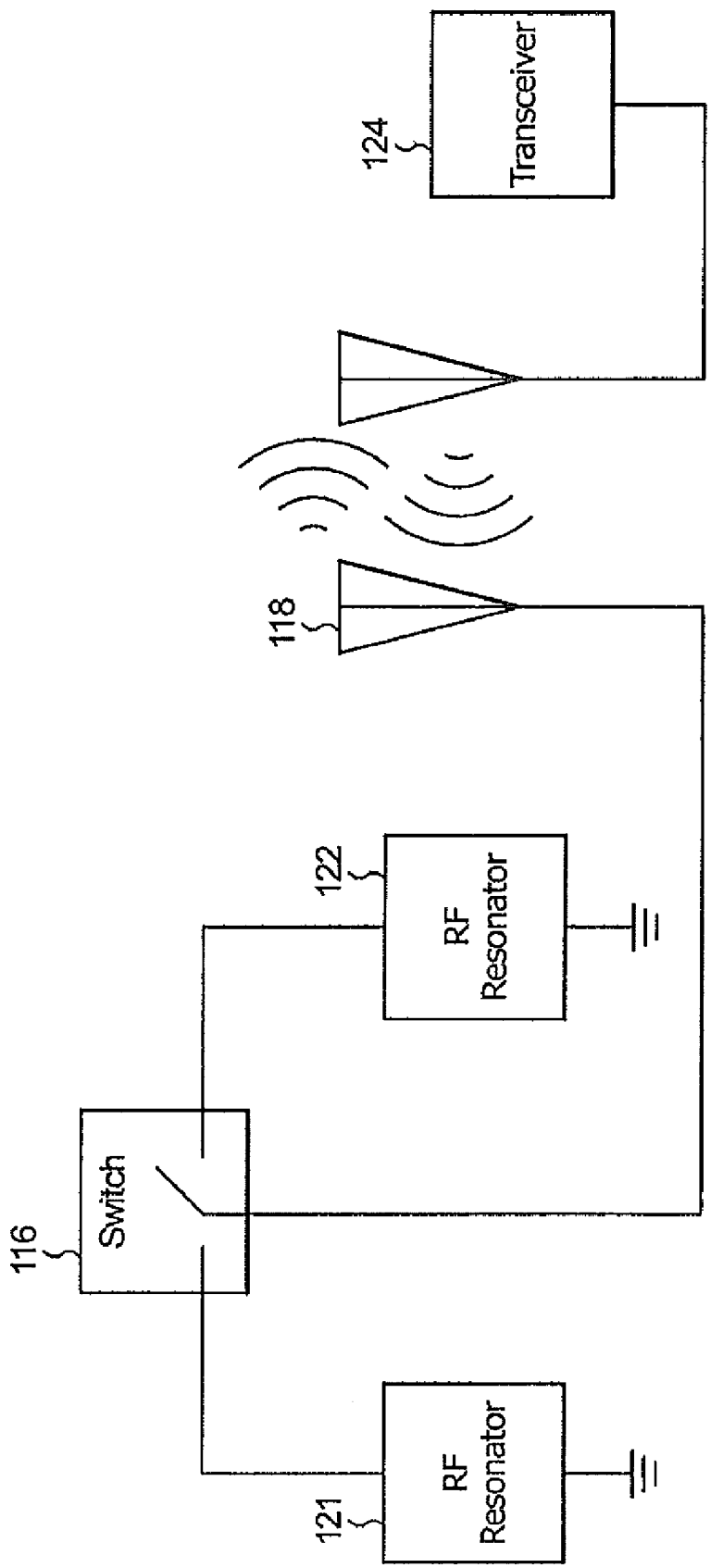
FIG. 6 is a schematic view of the sensor of FIG. 4 in accordance with the present invention, showing the how the switch can alternatively connect one or the other RF resonators to the antenna to send a signal indicative of the opened or secured state of the latch.

In further accordance with the invention, a resonant circuit is provided. The resonant circuit is configured and adapted to transmit a status signal when the latch is in a secured state. For purposes of illustration and not limitation, as embodied herein and as depicted in FIG. 6, sensor 100 includes resonant circuit 120. Circuit 120 includes antenna 118 and switch 116, as described above.

Circuit 120 also includes a pair of RF resonators 121 and 122, which are configured and adapted to receive RF energy and to emit and/or reflect RF energy at a characteristic frequency with low power loss. Examples of suitable RF resonators include, for example, surface acoustic wave (SAW) resonators, and micro-electro-mechanical machine (MEMS) resonators, electrical resonators of the inductor-capacitor sort, and the like. Those skilled in the art will recognize other suitable resonators that can be used without departing from the spirit and scope of the invention. RF resonator 121 has a characteristic frequency $f_1$ and RF resonator 122 has a characteristic frequency $f_2$ that is different from $f_1$.

Switch 116 is actuated as described above between a first and second position depending on whether the latch is open or secured. When latch 104 is secured, switch 116 is in the first position, which connects RF resonator 121 to antenna 118. In this position, a signal at frequency $f_1$ will be transmitted through antenna 118 while a signal at frequency $f_2$ will not. Thus to a receiver some distance away, the $f_1$ signal will appear more powerful than the $f_2$ signal. When the latch is moved to the open position, switch 116 will be actuated to the second position, connecting RF resonator 122 to antenna 118 and disconnecting RF resonator 121 therefrom. Thus when the latch is open, the $f_2$ signal will appear more powerful than the $f_1$ signal. A detector sensitive to the frequencies $f_1/f_2$ of RF resonators 121/122 will be able to determine whether the latch is open or secured based on which frequency $f_1/f_2$ it receives most powerfully from antenna 118. Those skilled in the art will appreciate that the antenna can include anything capable of transmitting/receiving electromagnetic signals.

With reference still to FIG. 6, while circuit 120 is shown having two resonators 121, 122, those skilled in the art will appreciate other circuit configurations that can similarly send a signal based on the position of switch 116 without departing from the spirit and scope of the invention. One example is a circuit with only one resonator 121. Such a circuit can give an on-off signal depending on whether the latch is opened or secured. However, circuit 120 has an advantage over on-off type circuits because circuit 120 sends a signal regardless of whether the latch is opened or secured. Thus in either state of the latch it can be readily ascertained that the sensor is still functioning. With on-off type circuits, there is no way to distinguish the off-signal from various sensor malfunctions.

With reference again to FIGS. 2-3, there are a variety of possible locations where switch body 114 can be attached. Those skilled in the art will readily appreciate that there are numerous suitable locations for switch body 114 which will still allow for actuating switch 116 when latch 104 is opened and closed. For example, rather than being mounted to pin body 108, switch body 114 could be mounted to hook body 106 or to one of the brackets 110/112. Moreover, the invention is not limited to the specific latch depicted in FIGS. 2-8. Those skilled in the art will readily be able to modify sensor 100 to work on a variety of latches and in a variety of suitable locations on such latches, without departing from the spirit and scope of the invention.

In further accordance with the invention, a means for conveying status information of the latch to a location remote from the latch based on the status signal is provided. The conveying means is operably connected to the resonant circuit. For purposes of illustration and not limitation, as shown in FIG. 6, system 100 includes an RF transceiver 124. RF transceiver 124 is configured and adapted to send RF energy to power or excite RF resonators 121/122 and to receive RF signals from RF resonators 121/122. This can be done through an external antenna, as shown in FIG. 6, or by any other suitable antenna. RF transceiver 124 is configured to determine the state of the latch based on the signal ($f_1/f_2$). RF transceiver 124 conveys the status information to a remote location to inform a person or system of the status of the latch. The information can be transmitted wirelessly, optically, through ordinary wires, optic fibers, or by any other suitable information conveyance as is known in the art. Moreover, RF transceiver 124 can itself be powered through electrical lines, or through batteries as is known in the art.

The location of transceiver 124 can be varied depending on the specific application. One suitable location is to mount transceiver 124 to the bottom of the inner core of the engine, facing directly down over the cowl opening. This location gives transceiver 124 a fixed, stable, stationary location that is in close proximity to antenna 118 and other sensor components for strong signal reception. One advantage of this configuration is that only one piece (e.g. switch body 114) needs to be installed on latch 104 itself, without any wiring to latch 104, and without any battery changes in switch body 114 once the system is installed.

Figure 7:
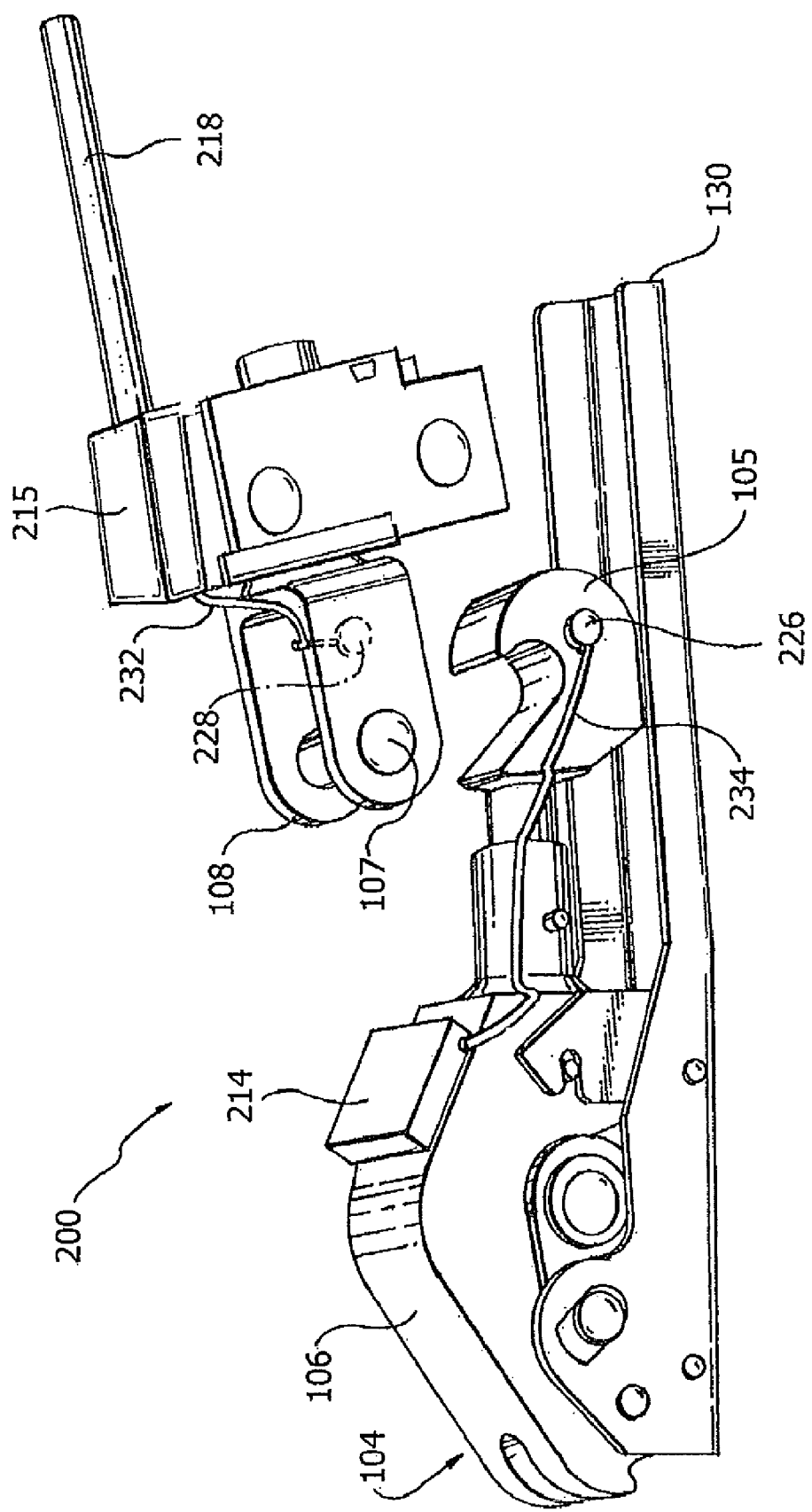
FIG. 7 is a perspective view of a second representative embodiment of a mechanical latch locking detection sensor in accordance with the present invention, showing the location of capacitor plates on the hook and latch bodies of the latch.
Figure 8:
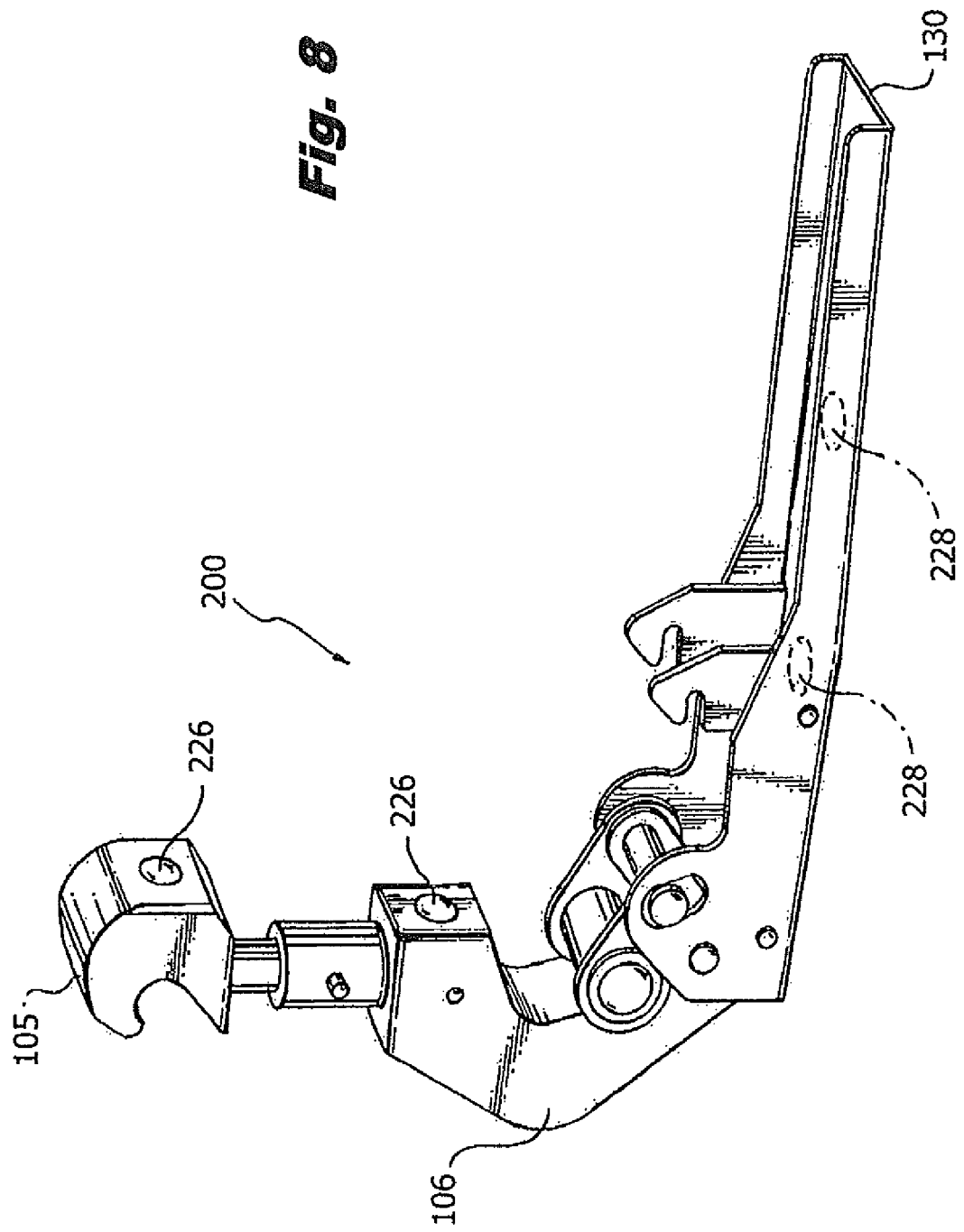
FIG. 8 is a perspective view of a portion of the sensor of FIG. 7 in accordance with the invention, showing different locations for the capacitor plates on the hook body and a handle body of the latch.

With reference now to FIGS. 7-8, another embodiment of a sensor in accordance with the invention is shown. For purposes of illustration and not limitation, as embodied herein and as depicted in FIG. 7, latch sensor 200 is provided further including a sensor body 214 attached to hook body 106, and an antenna body 215 attached to pin body 108. A first capacitor plate 226 is affixed to hook 105. Sensor lead 234 provides an electrical connection between first capacitor plate 226 and circuitry within sensor body 214. A second capacitor plate 228 (shown in hidden lines in FIG. 7) is affixed to pin body 108. Antenna lead 232 provides for an electrical connection between second capacitor plate 228 and antenna 218 through antenna body 215. Those skilled in the art will recognize that leads 232 and 234 are optional if antenna body 215 and sensor body 214 are configured so as to have capacitor plates 226 and 228 as integral components.

With continuing reference to FIG. 7, when latch 104 is open, capacitor plates 226 and 228 are spaced widely apart. However, when latch 104 is secured, hook 105 engages pin 107, bringing capacitor plates 226 and 228 into close proximity. In the secured position, capacitor plates 226 and 228 oppose each other to form a capacitor. In this "near condition," the overlap area of plates 226 and 228 is maximized and/or the gap between plates 226 and 228 is minimized, depending on whether the plate(s) are configured to move parallel to their faces, or to move perpendicular to their faces as the latch is operated. The opposite is true in the "far condition." The same is true whether the plates are moved relative to one another parallel or perpendicular to their own faces, or whether they are rotated into position along an axis parallel, perpendicular, or otherwise oriented to their faces. Any configuration which moves plates 226 and 228 relative to one another between a near and far condition when the latch is operated can be used in accordance with the invention. The capacitor thus formed allows for circuitry in sensor body 214 to couple to antenna 218 and therefore transmit a signal indicative of the status of latch 104.

Those skilled in the art will readily appreciate that there are numerous suitable locations for capacitor plates 226 and 228, any of which can be used without departing from the spirit and scope of the invention. FIG. 8 shows two of the many alternative locations for each capacitor plate, including two possible locations for second capacitor plate 228 on handle 130. Other suitable locations include brackets 110 and 112, or cowl doors 102. Any location can be used which brings capacitor plates 226 and 228 from relative separation to close proximity depending on whether the latch is opened or secured in accordance with the invention. An additional example of possible locations for plates 226 and 228 are shown on FIG. 2 with reference characters a and b, respectively.

Figure 9:
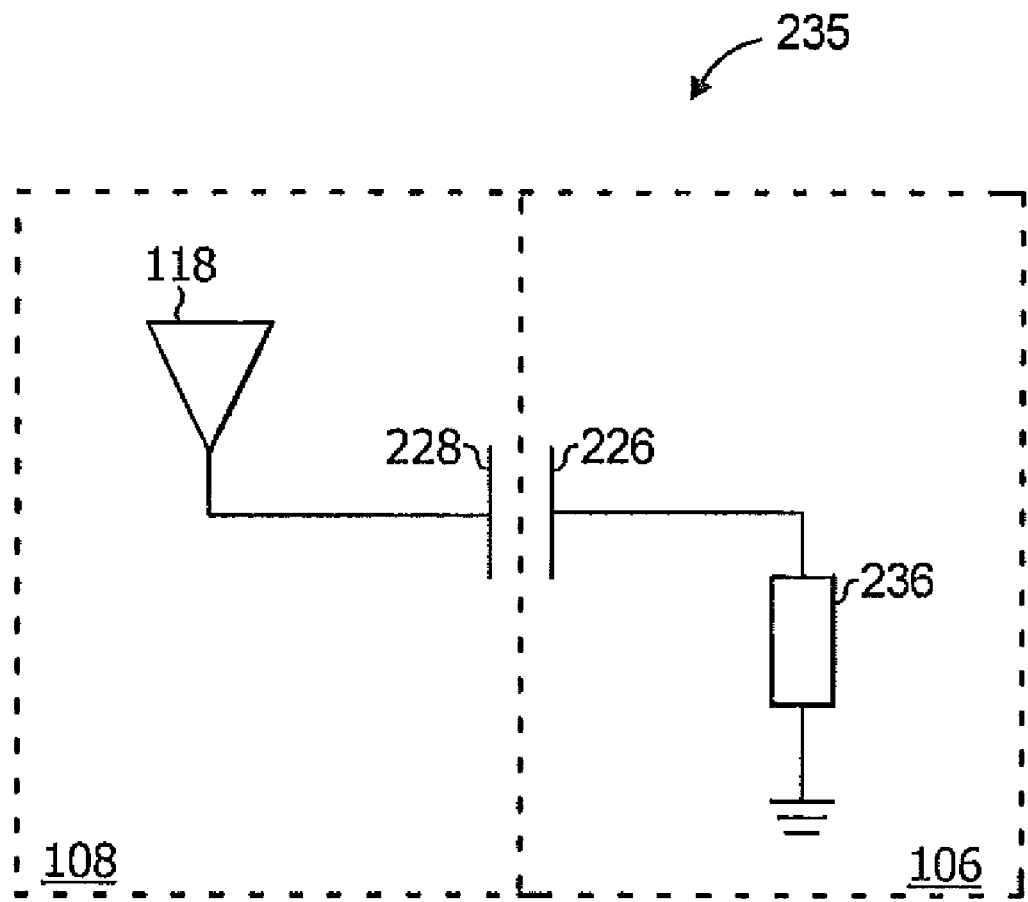
FIG. 9 is a schematic view of the sensor of FIG. 7 in accordance with the invention, showing an RF resonator connected to an antenna through a capacitor, one plate of which is attached to each of the hook and pin bodies of the latch.

A variety of different circuits can be used within sensor 200. One example is shown in the schematic of FIG. 9 and is designated generally by reference numeral 235. Circuit 235 includes a single RF resonator 236, which can be housed in sensor body 214. First capacitor plate 226 is affixed to hook body 106 and electrically connected to RF resonator 236, as described above. Second capacitor plate 228 is fixed to pin body 108 and is arranged to come into close opposition with first capacitor plate 226, as described above. Antenna 118 is electrically connected to second capacitor plate 228.

Circuit 235 interacts with an RF transceiver (e.g. transceiver 124) to provide an on/off signal indicative of whether latch 104 is secured. When latch 104 is open, plates 226 and 228 are spaced apart. This creates high impedance that effectively disconnects antenna 118 from RF resonator 236 and effectively prevents transmission of RF energy between transceiver 124 and RF resonator 236. The lack of a signal from RF resonator 236 is indicative of latch 104 being opened or unsecured. When latch 104 is secured, plates 226 and 228 are in close proximity, creating a capacitor that electrically couples antenna 118 to RF resonator 236. In this position, RF energy can be transmitted through antenna 118 between transceiver 124 and RF resonator 236 to provide a signal indicative of latch 104 being secured, much as described above with reference to resonant circuit 120.

Figure 10A:
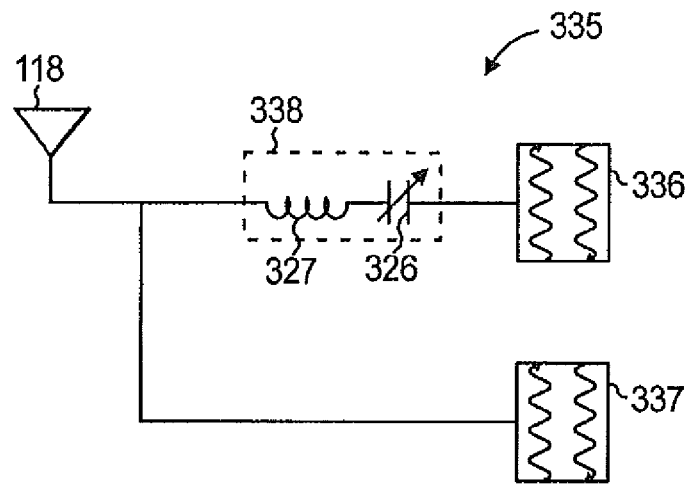
FIG. 10a is a schematic view of a third representative embodiment of a sensor in accordance with the invention, showing how two RF resonators can be connected to an antenna, one of the RF resonators connecting through an inductor in series with a variable capacitor, where the capacitor plates are moved together or apart when the latch is operated.
Figure 10B:
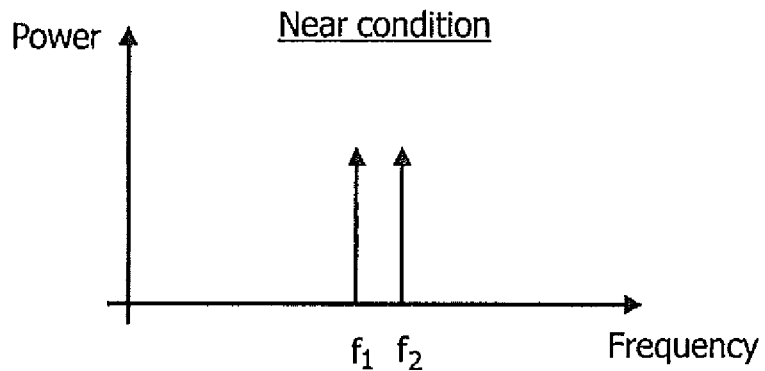
FIG. 10b is a chart showing the relative power of the signals from each RF resonator of FIG. 10a when the capacitor plates are near each other.
Figure 10C:
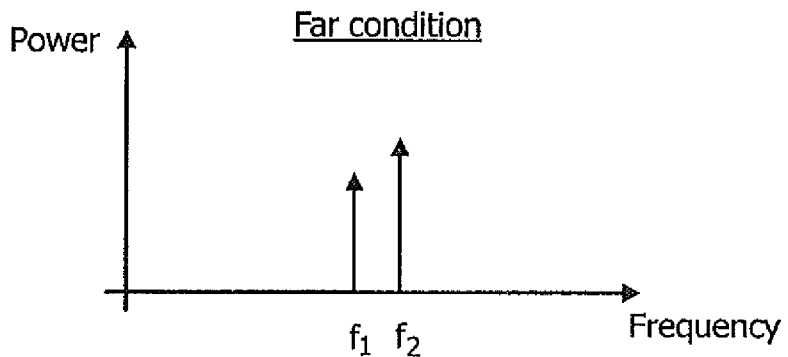
FIG. 10c is a chart showing the relative power of the signals from each RF resonator of FIG. 10a when the capacitor plates are far from each other.

FIGS. 10a-10c show another example of a circuit 335 that can be used in conjunction with capacitor plates 226 and 228. Variable capacitor 326 is the combination of two capacitor plates (e.g. 226 and 228), each of which is mounted to one of hook body 106 and pin body 108, or other suitable locations as described above. Inductor 327 is in series with capacitor 326. Inductor 327 can be located on the antenna side, as shown in FIG. 10a, or on the sensor body side of capacitor 326. Variable capacitor 326 and inductor 327 combine to form a variable LC resonator 338, having a characteristic frequency $f_1$ when capacitor 326 is in the near condition. A first RF resonator 336, having characteristic frequency $f_1$, connects to antenna 118 through LC resonator 338. A second RF resonator 337, having characteristic frequency $f_2$, connects directly to antenna 118, bypassing LC resonator 338.

In this configuration, second RF resonator 337 will be able to receive RF energy from RF transceiver 124 and return a signal to transceiver 124 regardless of whether latch 104 is opened or secured. However, first RF resonator 336 will experience variable attenuation in its connection to antenna 118 due to LC resonator 338. When capacitor plates 226 and 228 are in the near condition, RF resonator 336 will receive RF energy from transceiver 124 and return its signal ($f_1$) to transceiver 124, because the frequency of LC resonator 338 is matched to that of RF resonator 336. However, when capacitor plates 226 and 228 are in the far condition, LC resonator 338 will attenuate the connection between RF resonator 336 and antenna 118, effectively reducing the strength of the signal ($f_1$) from RF resonator 336 received at transceiver 124.

FIG. 10b shows a chart with the relative strength of signals $f_1$ and $f_2$ received at transceiver 124 from first and second RF resonators 336 and 337, respectively, when capacitor 326 is in the near condition. As FIG. 10b shows, transceiver 124 detects both frequencies at roughly the same strength, which is indicative of latch 104 being secured (those skilled in the art will appreciate that the signals may not be at exactly the same strength because of losses to $f_1$ occurring in LC resonator 338, however it is not necessary for the signals to be the same strength if they are calibrated). FIG. 10c shows a similar chart for the far condition of capacitor 326. In this condition, transceiver 124 receives the same strength signal at $f_2$ as before. However, the $f_1$ signal is significantly attenuated. This difference in signal strengths is indicative of latch 104 being unsecured.

Figure 11:
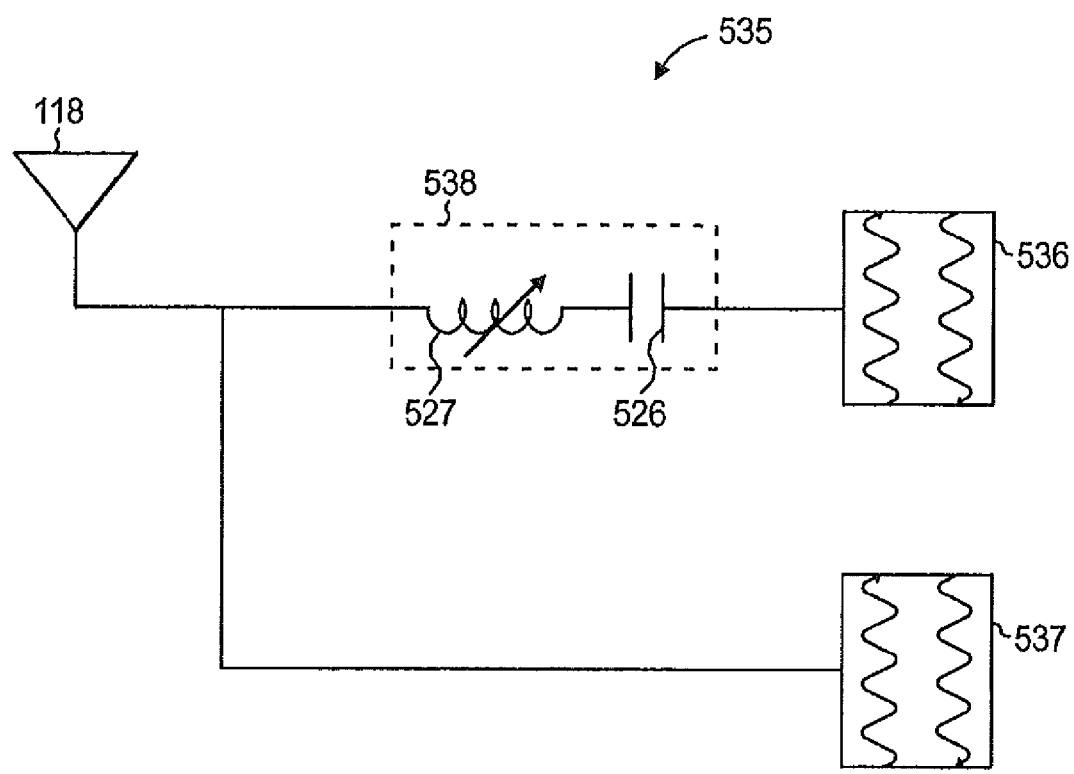
FIG. 11 is a schematic view of another representative embodiment of a sensor in accordance with the invention, showing how a variable inductor can be used in the LC resonator.

Using a variable capacitor as described above has the advantage of little or no mechanical wear. This is a result of the lack of mechanical contact between moving parts of sensor 200. However, those skilled in the art will recognize that circuit 335 can be practiced omitting inductor 327, using a variable inductor, or adding resistors or other additional components, without departing from the spirit and scope of the invention. FIG. 11 shows an example of a resonator circuit 535 that uses a variable inductor 527 in LC resonator 538, which also has a constant capacitor 526. Those skilled in the art will readily appreciate that capacitor 526 can be omitted without departing from the spirit and scope of the invention. First and second signals can be generated in first and second RF resonators 536 and 537, respectively, as described above.

Figure 12A:
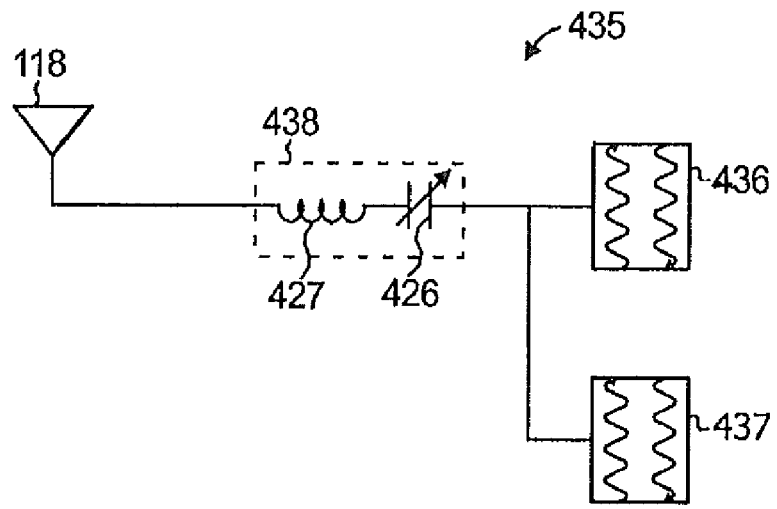
FIG. 12a is a schematic view of another representative embodiment of a sensor in accordance with the invention, showing how two RF resonators can be connected to an antenna, both of the RF resonators connecting through an inductor in series with a variable capacitor, where the capacitor plates are moved together or apart when the latch is operated.

By way of further example, FIGS. 12a-12e show another circuit 435 that can be used in conjunction with sensor 200. Variable capacitor 426 is the combination of two capacitor plates (e.g. 226 and 228), similar to capacitor 326 above. Inductor 427 is in series with capacitor 426. Inductor 427 can be located on the antenna side, as shown in FIG. 12a, or on the sensor body side of capacitor 426. Variable capacitor 426 and inductor 427 combine to form a variable LC resonator 438. A first RF resonator 436, having characteristic frequency connects to antenna 118 through LC resonator 438. A second RF resonator 437, having characteristic frequency $f_2$, connects to antenna 118 through LC resonator 438 in parallel with first RF resonator 436.

Figure 12B:
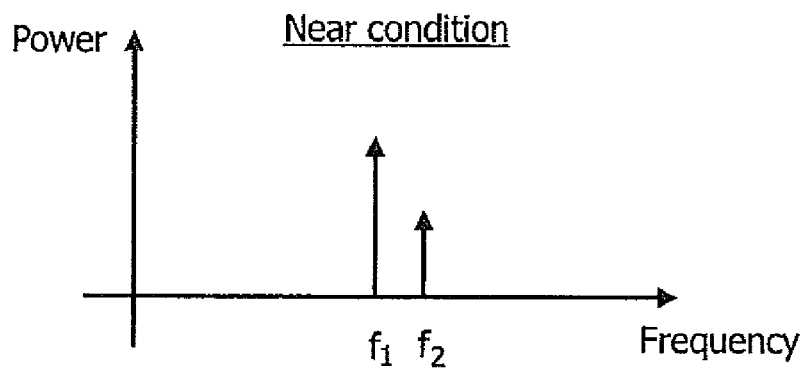
FIG. 12b is a chart showing the relative power of the signals from each RF resonator of FIG. 12a when the capacitor plates are near each other.
Figure 12C:
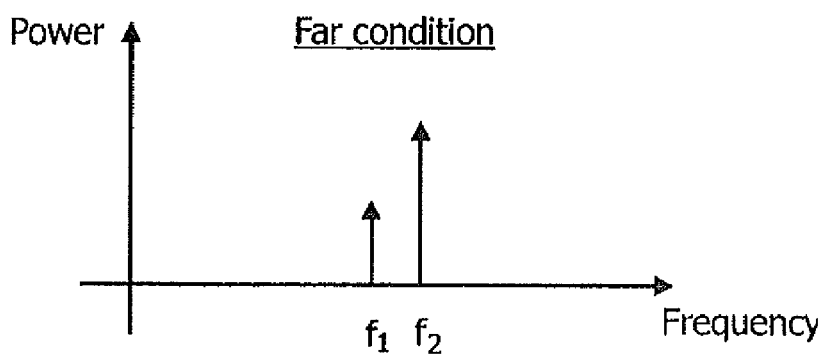
FIG. 12c is a chart showing the relative power of the signals from each RF resonator of FIG. 12a when the capacitor plates are far from each other.

In this configuration, the characteristic frequency of variable LC resonator 438 is approximately equal to $f_1$ when capacitor 426 is in the near configuration. When capacitor 426 is in the far configuration, the characteristic frequency of variable LC resonator 438 is approximately equal to $f_2$. Therefore, the relative strength of signals $f_1$ and $f_2$ received by transceiver 124 varies depending on whether latch 104 is opened or secured, as suggested in FIGS. 12b and 12c. As shown in FIG. 12b, when capacitor 426 is in the near condition, LC resonator 438 favors $f_1$ and attenuates $f_2$. FIG. 12c shows that when capacitor 426 is in the far condition, LC resonator 438 attenuates $f_1$ and favors $f_2$. Thus, the state of latch 104 can be determined based on which signal is most strongly received by transceiver 124.

Those skilled in the art will readily appreciate variations of the examples above that are within the spirit and scope of the invention. For instance, it is possible to configure an LC resonator in which the inductor is variable instead of the capacitor. Furthermore, while the near condition has been described as indicative of latch 104 being closed, and the far condition indicative of latch 104 being open, it is possible that some latch geometries could allow for the opposite. Also, while the signals have been described as first and second signals, those skilled in the art will readily appreciate that there can be additional signals at additional frequencies, or even a continuous range of signals over a continuous range of frequencies that can be used to ascertain the state of a latch without departing from the spirit and scope of the invention.

In accordance with another aspect of the invention, a method is provided for determining when a latch is opened or secured by detecting the proximity of a latch hook and a latch pin wherein the latch hook and pin are engaged together when the latch is in a secured state and are disengaged from each other when the latch is in an opened state. The method includes the steps of transmitting a first RF signal from an RF resonator circuit when the latch is in the secured state, transmitting a second RF signal when the latch is in the opened state, and conveying status information regarding the opened or secured state to a location remote from the latch based on at least one of the signals.

For purposes of illustration and not limitation, as embodied herein and as depicted in FIGS. 1-12, a first RF signal (e.g. $f_1$) is transmitted from an RF resonator circuit (e.g. 121, 236, 336, and 436) when a latch (e.g. 104) is in the secured state, as described above in conjunction with the sensors of the invention.

In further accordance with the invention, the method includes the further step of transmitting a second RF signal when the latch is in the opened state. The second signal can be an "off" signal, or an RF signal at a different frequency (e.g. $f_2$) from the first signal, as described above in conjunction with the sensors of the invention. The second signal can be sent from a second RF resonator circuit (e.g. 122, 337, 437), or from the same RF resonator circuit as an "off" signal or as signal with a frequency modified through additional components. The first and second signals are indicative of proximity of two or more parts of the latch that are close when the latch is secured and far when the latch is open (or vice versa). The signals are thus indicative of whether the latch is open or secured.

In further accordance with the invention, the method includes conveying status information regarding the opened or secured state to a location remote from the latch based on at least one of the signals. The step of conveying can be accomplished with a transceiver (e.g. 124) as described above. It is contemplated that the information can be conveyed through wires, optic fibers, or wirelessly as in RF or optical transmissions, for example.

It is further contemplated that the information be displayed on a console allowing a person to ascertain the status of the latch. Such a console could be located at a station where ground crews could check the status of the latches of all engine cowls on an aircraft, for example. A similar console could be located inside the aircraft for the crew, and particularly in the cockpit for the pilots, for example. It is also possible that the information could be displayed in any other suitable location, such as a control tower or elsewhere in an airport terminal. Moreover, the information could be supplied to a computer or other system on board an aircraft. This could be used, for example, to prevent an aircraft from pulling away from its gate if an engine cowl door is not secured.

In further accordance with the method of the invention, it is also possible to include steps of transmitting RF energy from an RF transceiver (e.g. 124) and receiving RF energy in the RF resonator circuit (e.g. 120, 235, 335, and 435) to power the RF resonator circuit. In this configuration, the sensor can send and receive information wirelessly as well as be powered/excited wirelessly. Thus while transceiver 124 needs electrical wiring or batteries, the sensor body itself need not have batteries or be integrated with wiring into existing systems. This allows for easy sensor replacement as well as simple retrofitting of existing latches.

The invention also includes a kit for retrofitting a latch for securing an engine cowl on an aircraft, wherein the latch includes a hook and a pin which engage each other when the latch is in a secured state and disengage each other when the latch is in an opened state. The kit includes an RF resonator circuit configured and adapted to transmit a first signal when the latch of the engine cowl is in the opened state, and to transmit a second signal when the latch of the engine cowl is in the secured state. The kit also includes a means for conveying status information regarding the status of the latch based on the first and second signal to a second location. The means for conveying are configured and adapted to be operably connected to the RF resonator circuit.

For purposes of illustration and not limitation, as embodied herein and as depicted in FIGS. 1-11, the kit of the invention includes an RF resonator circuit (e.g. 120, 235, 335, and 435). The RF resonator circuit is configured and adapted to transmit a first signal when the latch (e.g. 104) of the engine cowl is the opened state, and to transmit a second signal when the latch is in the secured state, as described above. The kit also includes a means for conveying status information regarding the status of the latch based on the first and second signals to a second location. The means for conveying can be an RF transceiver (e.g. transceiver 124) or other suitable means for receiving signals from the RF resonator circuit. The means for conveying is operably connected to the RF resonator circuit so as to receive signals indicative of the state of the latch, and to convey the information of the state of the latch to a remote location where the information can be used by a person or system, as described above.

In further accordance with the invention, the kit can include an electromechanical switch (e.g. 116) with a switch body (e.g. 114) configured and adapted to be attached to either the hook (e.g. 105) or pin (e.g. 108) of the latch (e.g. 104). The switch body can also be attached to structures related to the pin and hook, such as a bracket or hook/pin body (e.g. 106, 108, 110, 112), or opposed cowl doors 102.

The actuator (e.g. 116) of the switch is designed to be moved by components of the latch to a first position when the latch is in the opened state, causing the circuit (e.g. 120) to transmit the first signal indicative of the latch being in the opened state. The actuator is also designed to be moved by latch components to a second position when the latch is in the secured state, causing the RF resonator circuit to transmit the second signal (which can include an "off" signal, a signal at a different frequency from the first signal, or other suitable signal different from the first signal) indicative of the latch being in the secured state. The switch can be of a known type, including mechanical limit switches. A resilient member in the switch can bias the switch to the first position when the latch is in the opened state. It is also possible to configure the switch to be urged toward the second position when the latch is in the closed state, depending on the intended location of the switch body and the configuration of the latch. It is also possible to locate the switch so that no resilient member is required because the latch can act to move the switch both directions.

The switch body can be configured to be attached to the hook (or related structures) so that the actuator can be moved to the second position when the latch is moved to the secured state. It is also possible to configure the switch body to be attached to the pin (or related structures) so the actuator can be moved to the second position when the latch is moved to the secured state.

In further accordance with the invention, the kit can include an RF resonator circuit (e.g. 235, 335, 435) including an antenna (e.g. 118) coupled to a capacitor (e.g. 326). The capacitor has a first plate (e.g. 226) which can be attached to the hook of the latch (or other structure related to the hook, such as hook body 106 or hook body bracket 110). A second plate (e.g. 228) is included in the kit, for attaching to the pin of the latch (or related pin body 108 or bracket structure 112). As described above, the plates of the kit are designed to be attached to the latch in such a manner as to be spaced widely apart and/or out of alignment when the latch is in the open state, and to be in closely aligned proximity when the latch is secured. Thus the kit can be used to install a sensor on an existing latch to allow for a signal to be transmitted (e.g. through antenna 118 and/or transceiver 124) indicative of whether the latch is secured.

While the invention has been described above in the context of a latch for an aircraft engine cowl, it will be apparent to those skilled in the art that the invention can also be used in other contexts as well. The invention can be used to sense the state of any suitable latch. For example, the sensor can be used in various locations throughout an aircraft to sense the closing of latches, such as on any aircraft door, without departing from the spirit and scope of the invention. Moreover, while the invention has been described above with one antenna 118 for the resonant circuit, those skilled in the art will appreciate that it is also possible to use multiple antennae (for example one antenna per resonator) without departing from the spirit and scope of the invention.

The methods and systems of the present invention, as described above and shown in the drawings, provide for an RE powered, stand-alone wireless latch sensor with superior properties including sensitivity, reliability, ease of changeout for replacement, and ease of installation and retrofitting. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A sensor for determining when a latch for securing an engine cowl of an aircraft is secured, the sensor comprising:
   a) a resonant circuit including an electromechanical switch having a switch body configured and adapted to be connected to one of a hook and a pin of the latch, and a moveable actuator moveable to a plurality of positions to transmit a first signal when the latch is in an opened state, and to transmit a second signal when the latch is in a secured state; and
   b) a means for conveying status information of the latch to a location remote from the latch based on one of the first and second signals, the conveying means being operatively connected to the resonant circuit.

2. A sensor as recited in claim 1, wherein the actuator is moved to a first position when the latch is in the opened state to cause the circuit to transmit the first signal indicative of the latch being open.

3. A sensor as recited in claim 2, wherein the actuator is moved to a second position when the latch is in the secured state to cause the circuit to transmit the second signal indicative of the latch being secured.

4. A sensor as recited in claim 1, further comprising a resilient member configured to urge the actuator to the first position when the latch is in the opened state.

5. A sensor as recited in claim 4, wherein the switch body is configured to be connected to the hook, wherein the actuator is moved to the second position when the latch is moved to the secured state.

6. A sensor as recited in claim 4, wherein the switch body is configured to be connected to the pin, wherein the actuator is moved to the second position when the latch is moved to the secured state.

7. A sensor as recited in claim 4, wherein the resonant circuit includes a first RF emitter configured to transmit the first signal at a first frequency and a second RF emitter configured to transmit the second signal at a second frequency, and wherein the actuator is configured to electrically connect an antenna to one of the first and second RF emitters at a time, wherein the actuator connects the first emitter to the antenna to transmit the first frequency in the first position and the actuator connects the second emitter to the antenna to transmit the second frequency in the second position.

8. A sensor as recited in claim 7, further comprising an RF power source configured to transmit RF energy to power the RF emitters, wherein the first and second RF emitters are MEMS RF resonators.

9. A sensor as recited in claim 8, wherein the RF power source and the conveying means are combined in an RF transceiver.

* * * * *